United States Patent
Raji et al.

(10) Patent No.: US 11,541,313 B2
(45) Date of Patent: Jan. 3, 2023

(54) SYSTEMS AND METHODS FOR PROVIDING CUSTOMIZED GAME TEASERS TO A USER BASED ON USER REFERENCES

(71) Applicant: SONY INTERACTIVE ENTERTAINMENT LLC, San Mateo, CA (US)

(72) Inventors: Oludemilade Raji, San Mateo, CA (US); Jenna Lohouse, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/198,063

(22) Filed: Mar. 10, 2021

(65) Prior Publication Data

US 2022/0288493 A1 Sep. 15, 2022

(51) Int. Cl.
| | | |
|---|---|---|
| A63F 13/61 | (2014.01) | |
| A63F 13/79 | (2014.01) | |
| A63F 13/85 | (2014.01) | |
| G07F 17/32 | (2006.01) | |
| A63F 13/86 | (2014.01) | |
| A63F 13/67 | (2014.01) | |

(52) U.S. Cl.
CPC .............. *A63F 13/61* (2014.09); *A63F 13/67* (2014.09); *A63F 13/79* (2014.09); *A63F 13/85* (2014.09); *A63F 13/86* (2014.09); *G07F 17/323* (2013.01); *G07F 17/3237* (2013.01); *G07F 17/3255* (2013.01)

(58) Field of Classification Search
None
See application file for complete search history.

(56) References Cited

U.S. PATENT DOCUMENTS

| | | | | |
|---|---|---|---|---|
| 2008/0096650 | A1* | 4/2008 | Baerlocher | G07F 17/34 463/30 |
| 2009/0280909 | A1* | 11/2009 | McEniry | A63F 13/88 463/42 |
| 2014/0256420 | A1* | 9/2014 | Justice | G06F 12/00 463/29 |
| 2018/0117462 | A1* | 5/2018 | Miura | A63F 13/2145 |
| 2020/0411056 | A1* | 12/2020 | Sundareson | H04L 65/60 |
| 2021/0165857 | A1 | 6/2021 | Pease et al. | |
| 2021/0260475 | A1* | 8/2021 | Dzjind | A63F 13/48 |
| 2022/0288498 | A1 | 9/2022 | Kumah | |

OTHER PUBLICATIONS

U.S. Appl. No. 17/198,066 Office Action dated Oct. 5, 2021.
U.S. Appl. No. 17/198,066 Final Office Action dated Jul. 11, 2022.

* cited by examiner

*Primary Examiner* — Jason T Yen
(74) *Attorney, Agent, or Firm* — Polsinelli PC

(57) ABSTRACT

The present disclosure relates to systems and methods providing customized video game trailers or teasers as interactive gaming applications to users in order to entice a purchase of a full-version of the game. In various aspects, the interactive gaming application may be configured to cater to a particular user's interests, preferences, or gaming styles. Additionally, the systems and methods may prompt the user to purchase the full game at the height or apex of their engagement with the interactive application. In various aspects, the user interest and preferences may be determined based upon the users conscious or subconscious interactions with a variety of other services.

24 Claims, 6 Drawing Sheets

500

```
┌─────────────────────────────────────────────────────────┐
│ Receive and store information regarding a game of      │
│ interest to a user                            510       │
└─────────────────────────────────────────────────────────┘
                            │
                            ▼
┌─────────────────────────────────────────────────────────┐
│ Identify a style or preference of the user    520       │
└─────────────────────────────────────────────────────────┘
                            │
                            ▼
┌─────────────────────────────────────────────────────────┐
│ Identify or generate an interactive gaming application  │
│                                               530       │
└─────────────────────────────────────────────────────────┘
                            │
                            ▼
┌─────────────────────────────────────────────────────────┐
│ Provide the interactive gaming application to user     │
│ client device                                 540       │
└─────────────────────────────────────────────────────────┘
                            │
                            ▼
┌─────────────────────────────────────────────────────────┐
│ Receive user reaction data                    550       │
└─────────────────────────────────────────────────────────┘
                            │
                            ▼
┌─────────────────────────────────────────────────────────┐
│ Generate and display prompt to purchase the game       │
│                                               560       │
└─────────────────────────────────────────────────────────┘
```

Figure 5

SYSTEMS AND METHODS FOR PROVIDING CUSTOMIZED GAME TEASERS TO A USER BASED ON USER REFERENCES

BACKGROUND

1. Field of Disclosure

The present disclosure generally relates to video game advertising. More specifically, the present disclosure relates to presenting or providing game trailers or game teasers to users based on user preferences to heighten interest or entice a purchase of the presented game.

2. Description of the Related Art

Video games have existed for several decades. Although they began as simple games and simulations used by computer scientists, video games have evolved to include complex designs and operations. In addition to the evolution in the games themselves, the video game industry and number of designers therein have a grown exponentially as well. As such, there is great competition amongst video game designers and makers to attract and retain video game players.

In response to increased competition, video game designers have devised means to provide potential players the ability to play a test level or portion of the video game. Unfortunately, many of these trial or teaser levels are chosen arbitrarily and may not appeal to many players. As such, there is a need for systems and methods that may select portions of a video game most likely to appeal to and entice video game players to purchase the video game.

SUMMARY OF THE CLAIMED DISCLOSURE

According to one aspect, the present disclosure relates to a method for providing customized game teasers to a user at a user device based on user preferences. The method may include receiving data identifying an interest in a game and determining a gaming style/interest profile of the user. The method further includes selecting an interactive gaming application corresponding to the gaming style/interest profile wherein the selection is based user playing style and interests and providing the interactive gaming application to the user device.

According to another aspect, the present disclosure relates to a system for providing customized game teasers to a user at a user device based on user preferences. The system may include a database that stores game data and an interactive gaming application. The system may also include a gaming server that provides the gaming data and the interactive gaming application. According to one aspect, the gaming server receives data identifying an interest in a game and determines a gaming style/interest profile of the user. The gaming server also selects the interactive gaming application corresponding to the gaming style/interest profile wherein the selection is based user playing style and interests and provides the interactive gaming application to the user device.

According to various aspects of the disclosed systems and methods, identifying a gaming style/interest profile of the user further includes predicting a gaming sequence appealing to the user. In another aspect, the method also includes comprising identifying a user response to the interactive gaming application provided to the client device; wherein the interactive gaming application is terminated during a period of peak interest.

According to one aspect, the period of peak interest is determined before providing the interactive gaming application to the user device; while in another aspect, the period of peak interest is determined during play of the interactive gaming application in response to a user reaction received from the user device. In various aspects, the determination of the gaming style/interest is based upon user interactions with at least one of a survey, a video game, or other visual displays. In these aspects, the user interactions with at least one of a survey, a video game, or other visual display may a conscious or a subconscious interaction.

According to various aspects, the aforementioned methods may be embodied as a program or instructions in a non-transitory computer readable medium executable by processor in computing network. The embodied program or portions thereof may be executed on multiple computing devices across a network.

BRIEF DESCRIPTION OF THE DRAWINGS

FIG. 5 is a flowchart illustrating a method of generating and providing a customized game teaser based on user preferences using the system of FIG. 1.

DETAILED DESCRIPTION

The present disclosure describes methods and systems for user providing customized video game teasers to users in order to pique their interest, enhance engagement with a video game network, and/or purchase the game. In one aspect, the game teaser provided to the user may be selected based on user preferences that may indicate an affinity for a particular gaming style, a particular user interest, or other aspects about a game that may appeal to the user, such as a particular style of music.

Figure 1:
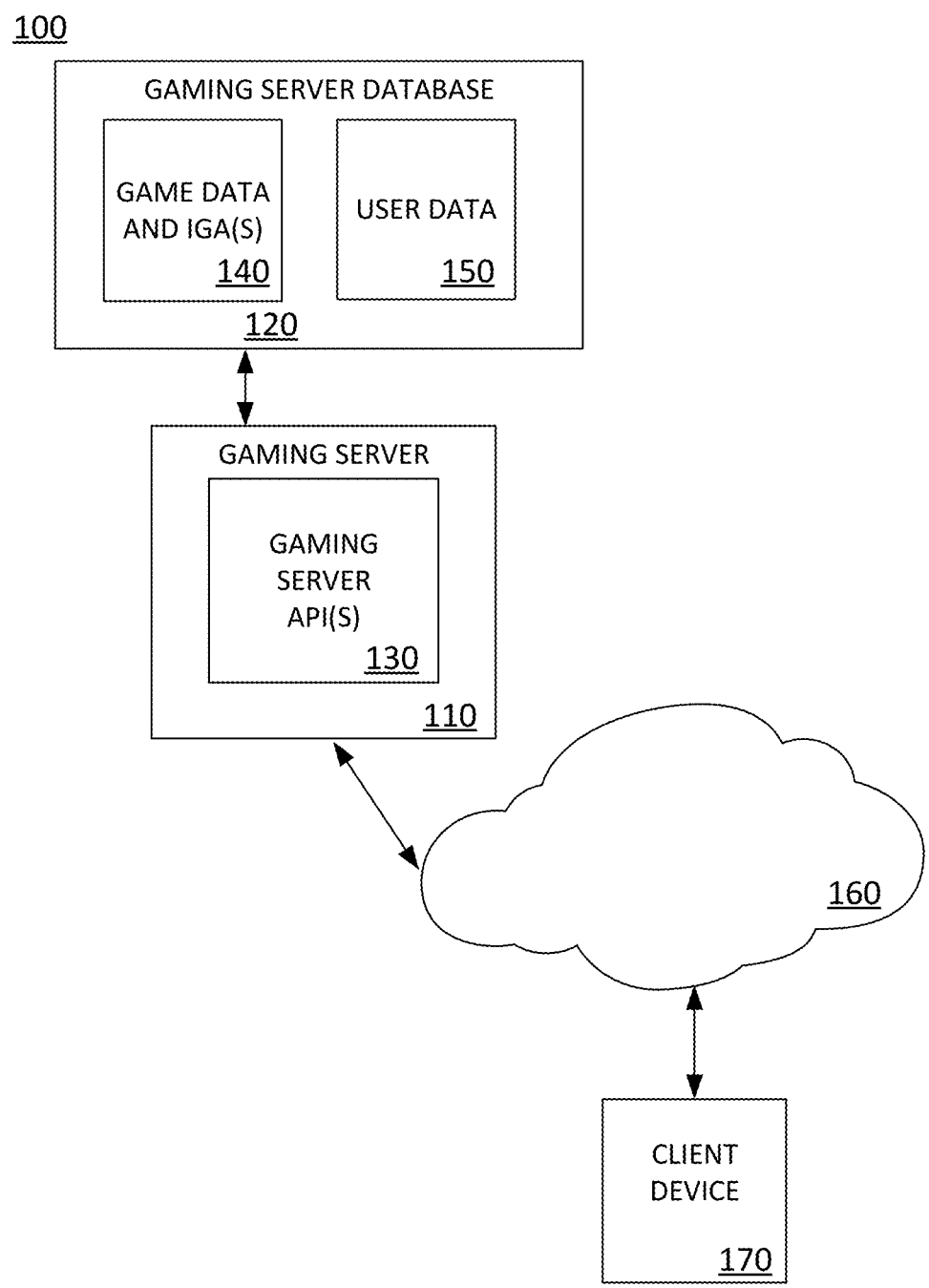
FIG. 1 illustrates an exemplary network environment in which a system for providing customized game teasers may be implemented.

FIG. 1 illustrates a network environment 100 in which a system for providing customized game teasers to users may be implemented. The network environment 100 may include a game hosting server 110 that may store host games for streaming or download by users of the client device 170. Full video games, video game data, and other applications related to the video games stored or hosted by the gaming server 110 may be stored in a database 120, for distribution using one or more application program interfaces (APIs) 130 of the gaming server. The network environment 100 may also include a public network 160, one or more client device 170.

In one aspect, the gaming server 110 includes memory and one or more processor to execute or otherwise provide access to one or more games, game data or interactive gaming application 140 stored in the gaming server database 120. The gaming server database 120 also stores user profile data 150 including various user preferences and other data regarding each user.

As used herein an interactive gaming application 140 refers to a sub-portion of a video game or a compilation of video game elements that are composed into a playable game teaser or trial game. The interactive gaming application may be provided to users of a client device 170 in communication with the gaming server 110 so that the users may play a portion of a related video game before purchasing the game.

In various aspects, the gaming server 110 may be any type of server computing device, and may be configured as one or more virtual machines executing on one or more hosts. The gaming server 110 may be further configured to provide additional services and/or content to a user of a client device 170. In various other aspects, users at the client devices 170 may sign up, subscribe, or purchase various levels of access rights to data and games on the gaming server 110. As such, the users may have access to various interactive gaming applications allowing the users to experience actual game play within a game of interest before purchasing. In addition to playing portions of the game users may also view a video trailer or preview of the game that includes video clips of game play sequences found within the game in one example. According to various embodiments, whether viewing a trailer or playing an interactive gaming application, the systems and methods disclosed herein may be used to provide customized trailers and gaming applications to the users to further entice purchases of the game. server 110 server 11.

Communication between the client device 170 and the gaming server 110 may be facilitated by a gaming server API 130 in order to obtain information about games and interactive gaming applications available to a user of the client device 170. Additional information about the game may include metadata describing the available content (e.g., gaming developer, related games having the same characters, title, and game genre). The information may also include a location where the content is stored (e.g., URL) so that the user device can proceed with retrieving the content from the content provider server 110. Furthermore, the gaming server API 130 may include instructions or graphic user interfaces for implementing functionalities (e.g., providing reviews and feedback or purchasing the full game).

The public network 160 facilitates communication of the steaming media from the content provider server 110 and the gaming server 110 with the plurality of client device 170. The public network 160 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider or internet service provider.

The client device 170 may be one or more of a plurality of different types of computing devices. For example, the client device 170 may be any number of different gaming consoles, mobile devices, laptops, and desktops. Such client device 170 may also be configured to access data from other storage media, such as, but not limited to memory cards or disk drives as may be appropriate in the case of downloaded services. Such client device 170 may include standard hardware computing components such as, but not limited to network and media interfaces, non-transitory computer-readable storage (memory), and processors for executing instructions that may be stored in memory. These client device 170 may also run using a variety of different operating systems (e.g., iOS, Android), applications or computing languages (e.g., C++, JavaScript). An exemplary client device 170 is described in detail herein with respect to FIG. 2.

Figure 2:
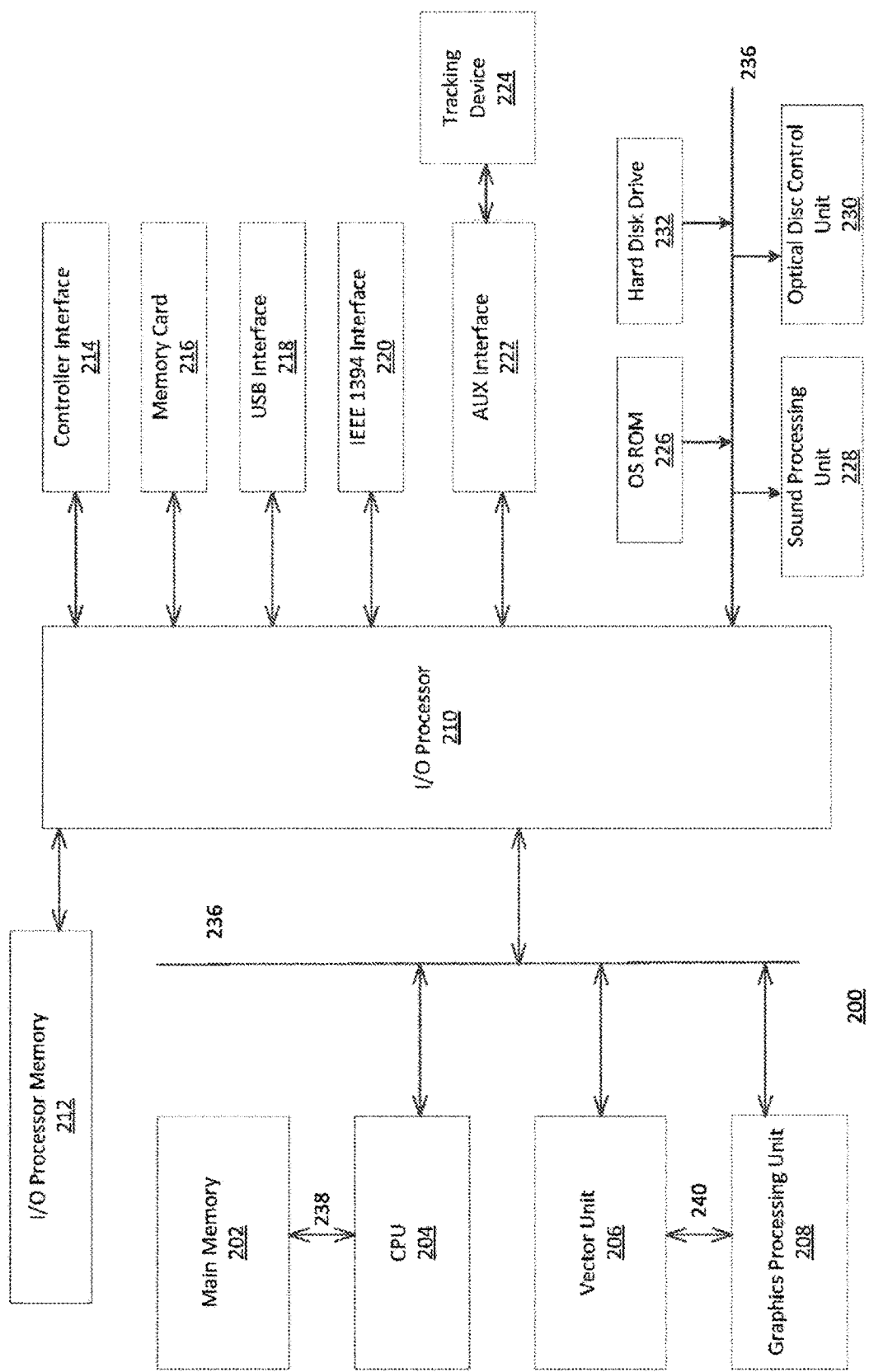
FIG. 2 is an exemplary user device that may be used in context of the system of FIG. 1.

FIG. 2 is an exemplary computing device 200 that may be used in context of the system of FIG. 1 to view streaming media, among other functionalities. The client device 200 may correspond to client device 170 of FIG. 1 and may be inclusive of desktop, laptop, tablet, mobile device, console gaming system, etc. The client device 200 is a device that the user can user to browse, select, and try video games through playing interactive gaming applications. In particular, the client device 200 allows the user to purchase, download, and play the video game.

The client device 200 may include various elements as illustrated in FIG. 2. It should be noted that the elements are exemplary and that other aspects may incorporate more or less than the elements illustrated. With reference to FIG. 2, the client device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE interface 220, an auxiliary (AUX) interface 222 for connecting a tracking device 224, although other bus standards and interfaces may be utilized. The client device 200 further includes an operating system read-only memory (OS ROM) 226, a sound processing unit 228, an optical disc control unit 230, and a hard disc drive 232, which are connected via a bus 234 to the I/O processor 210. The client device 200 further includes at least one tracking device 224.

The tracking device 224 may be a camera, which includes eye-tracking capabilities. The camera may be integrated into or attached as a peripheral device to client device 200. According to various aspects, typical eye-tracking devices may use infrared non-collimated light reflected from the eye and sensed by a camera or optical sensor. The information is then analyzed to extract eye rotation from changes in reflections. Camera-based trackers focus on one or both eyes and record their movement as the user looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the user may be needed before using the eye tracker.

In other aspects, trackers that are more sensitive may use reflections from the front of the cornea and that back of the lens of the eye as features to track over time. In yet other aspects, even more sensitive trackers image features from inside the eye, including retinal blood vessels, and follow these features as the eye rotates. Most eye-tracking devices may use a sampling rate of at least 30 Hz, although 50/60 Hz is most common. Some tracking devises may run as high as 240 Hz, which is needed to capture detail of very rapid eye movement. The foregoing describes example eye-tracking technology that may be used in accordance with the present disclosure. In various aspects, any known eye gaze tracking technology that one skilled in the art would be capable of applying could be used.

A range camera may instead be used with the present disclosure to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to client device 200 that captures voice data. The microphone may conduct acoustic source localization and/or ambient noise suppression. The microphones may be usable to receive verbal instructions from the user to schedule, retrieve, and display content on the client device 200.

Alternatively, tracking device 224 may be the controller of the user device 200. The controller may use a combination of built-in accelerometers and infrared detection to sense its position in 3D space when pointed at the LEDs in a sensor nearby, attached to, or integrated into the console of the entertainment system. This design allows users to control functionalities of the client device 200 with physical gestures as well as button-presses. The controller connects to the client device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement. Further still, in various aspects, any technology suitable for measuring and/or capturing motion, facial expressions and/or any other physical or physiological state of a user may be used.

As noted above, the client device 200 may be an electronic gaming console. Alternatively, the client device 200 may be implemented as a general-purpose computer, a set-top box, or a hand-held gaming device. Further, similar user devices may contain more or less operating components.

The CPU 204, the vector unit 206, the graphics-processing unit 208, and the I/O processor 210 communicate via a system bus 236. Further, the CPU 204 communicates with the main memory 202 via a dedicated bus 238, while the vector unit 206 and the graphics-processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 230. The I/O processor 210 primarily controls data exchanges between the various devices of the user device 200 including the CPU 204, the vector unit 206, the graphics processing unit 208, and the controller interface 214.

The graphics-processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics-processing unit 208. Furthermore, the sound processing unit 230 executes instructions to produce sound signals that are outputted to an audio device such as speakers (not shown).

A user of the client device 200 provides instructions via the controller interface 214 to the CPU 204. For example, the user may instruct the CPU 204 to store certain information on the memory card 216 or instruct the user device 200 to perform some specified action. Example controllers associated with the controller interface 214 may include a touch-screen, keyboards, and game controllers.

Other devices may be connected to the client device 200 via the USB interface 218, the IEEE interface 220, and the AUX interface 222. Specifically, a tracking device 224, including a camera or a sensor may be connected to the client device 200 via the AUX interface 222, while a controller may be connected via the USB interface 218. In some aspects, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
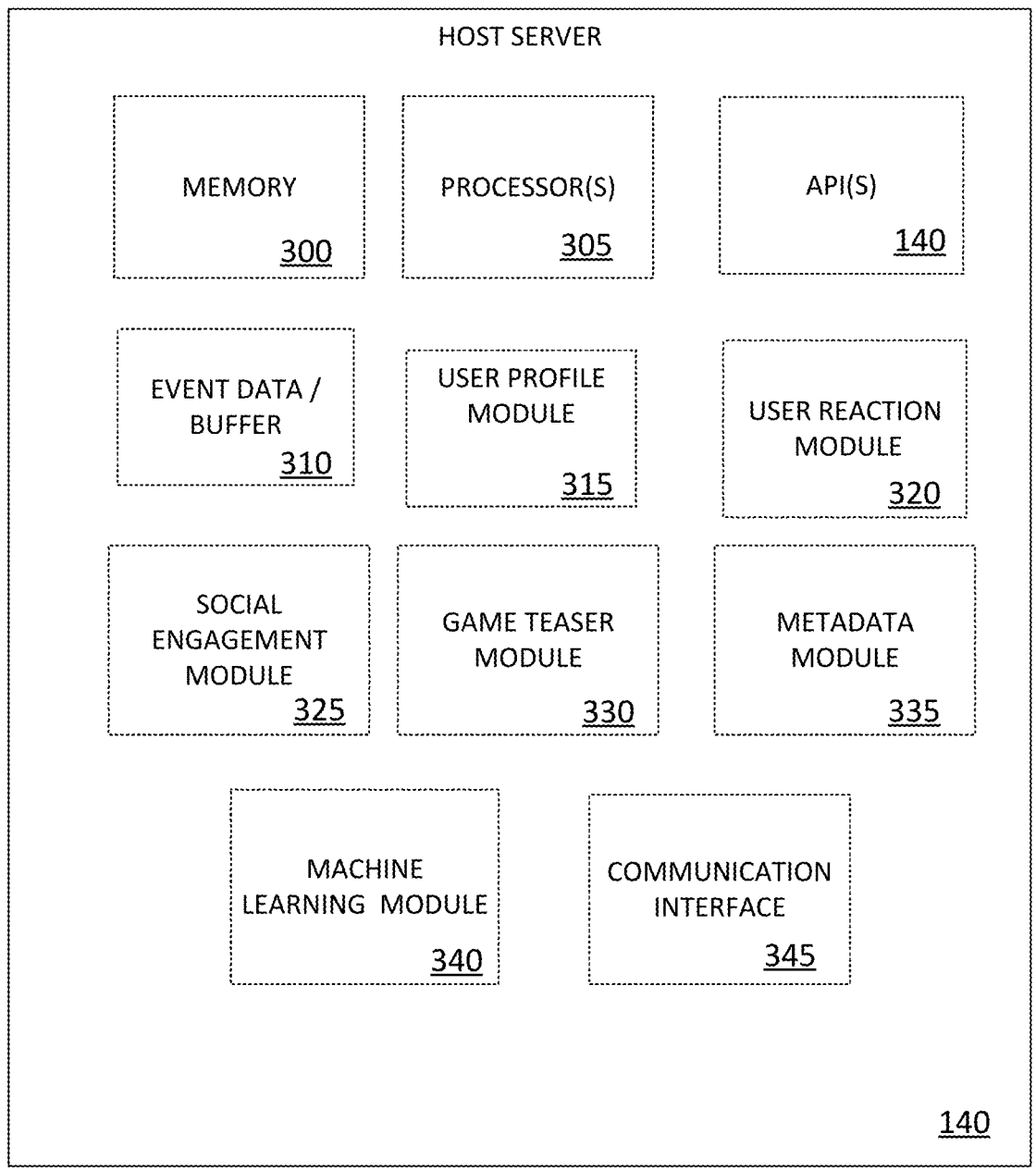
FIG. 3 is a block diagram of an exemplary gaming server that may be used in context of the system of FIG. 1.

FIG. 3 is a block diagram of an exemplary gaming server 110 that may be used in context of the system of FIG. 1. The gaming server 110 may include a plurality of different features that further facilitates the transmission of the game, gaming data, and the interactive gaming application. As illustrated in FIG. 3, the gaming server 110 may include memory 300, one or more processor 305, the gaming server application program interface (API) 130, a gaming application storage and buffer 310, a user profile module 315, a user reaction module 320, a social engagement module 325, a gaming teaser module 330, a metadata module 335, a machine learning module 340, and a communication interfaces 345.

According to one aspect, the host application program interface (API) 130 manages and controls how data, including but not limited to the interactive gaming application, is distributed to remote users. Using the API 130, an administrator (e.g., developer or gaming platform provider, game server administrator) can modify and monitor data available on the gaming server.

The gaming application storage and buffer 310 may be used to store game data or the interactive gaming application temporarily until it can be processed and distributed to users. In another aspect, the media storage and buffer may be used to store user profile data or inputs received from one or more client device 170 temporarily.

The user profile module 315 is used to store information about each user. In one aspect, users may need to create their own profile and sign in to their respective profiles before being allowed to access/view a gaming platform and games available to play or purchase. The stored user profiles may be used by the gaming server 110 to identify user preferences and other data regarding users of the system.

In one aspect, user data may further identify a preferred gaming style for a user. For example, a user may establish a preference for puzzle solving portions of a game. Alternatively, a user may display an interest for intense combat sequences of the video games or interactive gaming application. Furthermore, in various aspects the users gaming style or interest may be further classified regarding a preference, which may be further classified as a preference for melee weapons or projectile weapons. As such, user profile data indicative of aspects of a user's gaming style may be used to identify which interactive gaming application or portion thereof is most likely to increase the chances of the user purchasing the full game.

The user reaction module 320 receives and processes data related to a user's reaction to the presented interactive gaming application. The reactions may also include physical movements or facial expressions captured by the tracking device 224. During interaction with the gaming application, the user reaction module 320 captures data from the user's respective client device 170. In one aspect, the user reaction module 320 may identify a type of reaction made by the user and classify the same as an intense interest, or an enhanced engagement with the interactive gaming application, among others. In this aspect, the user reaction module may identify a user's reaction to the gaming application, such as dilated pupils or increases in user input's (e.g. rapidly pressing buttons on the controller indicative of heightened anticipation) as a reaction indicating further interest in the gaming application. In another example, the user reaction may be a full body motion such as moving closer to the display device associated with the client device or other motions that may be interpreted as displaying heighted interest in the gaming application. In various aspects, the user reaction module 320 identifies or alternatively predicts an apex of the user's interest and engagement with the interactive gaming application. Additionally, the user reaction module 320 may identify the particular gaming sequence or a portion of the interactive gaming application displayed when the user reactions may be indicative of heightened interest or an upcoming predicted apex of interest for future reference and analysis when generating other interactive gaming applications for the same game or other games available for purchase.

In response to the identification of a determined peak interest in the interactive gaming application, the user reaction module 320, alone or in conjunction with the gaming teaser module 330, may pause or terminate the interactive gaming application 140 and display a graphic user interface (GUI) or other interactive prompts 408 for the user to purchase the full version of the game, according to various aspects. As such, the present systems and methods may be used to provide a customized interactive gaming application that is customized to appeal to a user while further incentivizing the user to purchase the full-version of the game.

In one aspect, the gaming teaser module 330 identifies an existing interactive gaming application or generates a new interactive gaming application based upon an existing video game in response to a user input at the client 170 or in response to a user reaction. For example, In various aspects, the gaming teaser module 330 identifies existing video game data using data from the user's profile in conjunction with machine learning (e.g. artificial intelligence ("AI")) to generate a user-specific interactive gaming application 140 designed to appeal to the user.

In one aspect, the interactive gaming application 140 may be an existing chapter, part, or other portion of a game as provided by the game developers. Alternatively, the interactive gaming application XXX may be a unique customized gaming sequence composed of one or more game sequence or individual game elements (images, files, avatars, music etc.) and designed to appeal to a user based upon data in the user's profile. The customized interactive gaming application may be compiled in real-time or near real time. Alternatively, the customized interactive gaming application may be compiled and generated while the user is viewing a non-interactive video or graphic trailer for the game. In this aspect, upon indicating interest in a particular game and while viewing a video or graphic-based trailer for the game, the gaming server 110 may generate the unique customized interactive gaming application for subsequent playing by the viewer. In various aspects, each newly developed customized interactive gaming may be stored, along with associated metadata, for future play by the user or other users having similar interests.

The metadata module 335 generates and organizes metadata related to the interactive gaming application, the user's interactions with the system, including the interactive gaming applications, as well as the game and game data. Additionally, the generated metadata may be used to compile additional gaming sequences using previously generated interactive gaming applications. The metadata may also be used to recall previous instances of customized interactive gaming applications, and portions thereof.

The machine learning module 340 may be an internal or external artificial intelligence (AI) or other machine learning system trained using any suitable machine learning model, system, or dataset to predict or identify likely user preferences and likely actions while playing one or more video games, one or more interactive gaming applications or interacting with another activity. In one aspect, the machine learning module 340 may analyze data input by the user in response to a survey, quiz, or other interactive activity to predict a user's conscious and/or subconscious preferences and interests. These preferences and interests may be used by the gaming server 110 to identify a trailer or interactive gaming application will be the most appealing to the user.

In another aspect, the machine learning module 340 may also be used to predict user reactions and may adjust the tracking device 224 automatically. For example, the machine learning module 340 may determine when a user displays interest in a particular portion of the interactive gaming application. Based on this determination, the machine learning module 340 may instruct a tracking device 224 of the user's client device 170 to zoom-out to capture a predicted whole body reaction. Alternatively, the machine learning module 335 may provide instructions to the tracking device 224 to zoom-in on a user's face. The machine learning module 335 may determine the best tracking device 224 settings to capture a likely reaction based upon previous user actions, historic user reactions from all players of the game and/or the interactive gaming application, or combinations thereof. As such, the machine leaning module 335 may predict when the user is fully interested in or at least fully interactive with the interactive gaming application. As previously, described, the identification of peak interest from the user may be used to end the interactive gaming application, and prompt the display of purchase options to the user.

The communication interface 345 facilitates communication between the various features of the system of FIG. 1. For example, this would facilitate transmission of information from the gaming server 110 to the to the client device 170 over the network 160.

Figure 4A:
FIG. 4A is an illustration of an exemplary gaming sequence that may be provided to a user in the context of the system of FIG. 1.
Figure 4B:
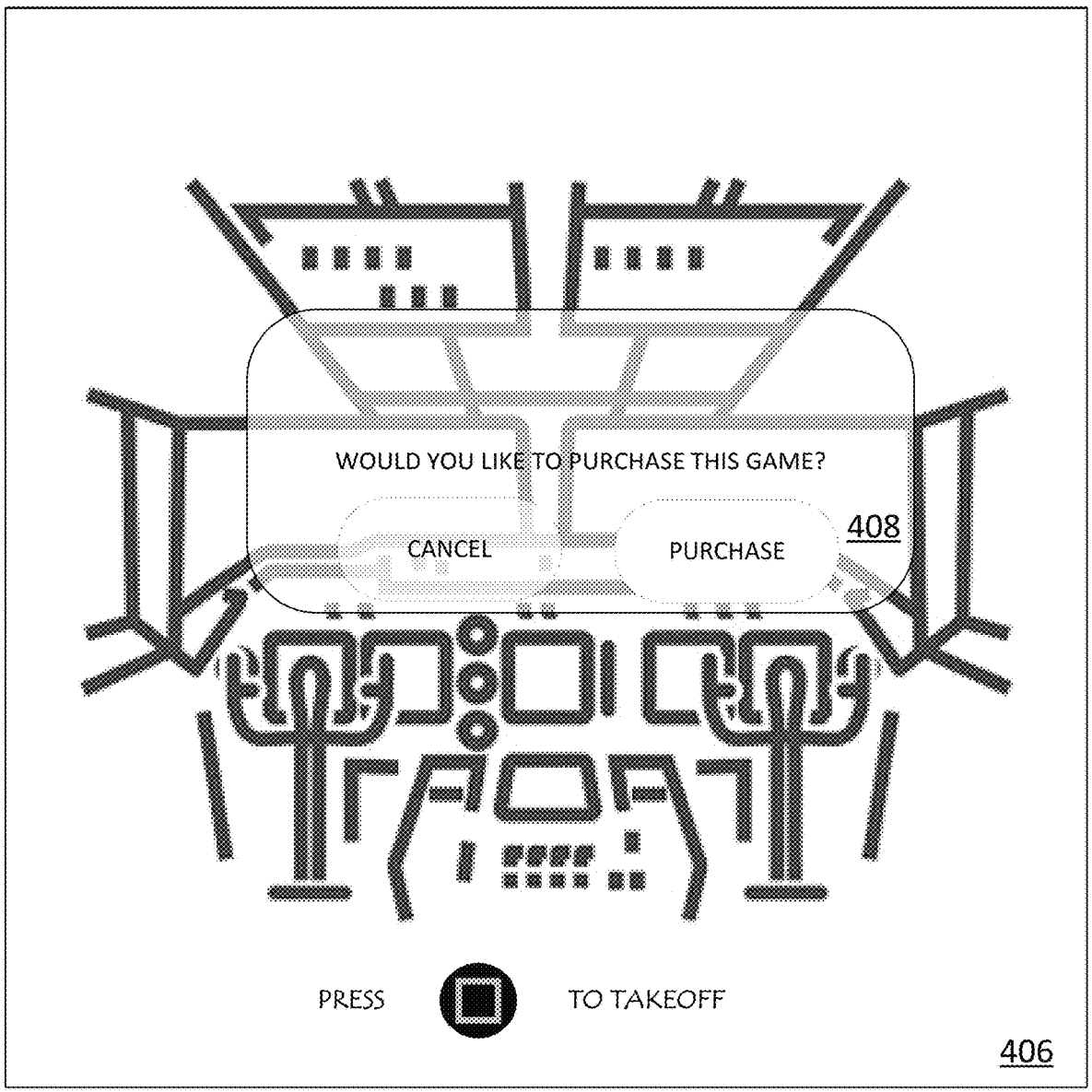
FIG. 4B is an illustration of another exemplary gaming sequence that may be provided to a user in the context of the system of FIG. 1.

Referring now to FIGS. 4A and 4B, exemplary displays from a customized interactive gaming application as displayed at a user client device 170 are shown according to one aspect. In this example, the user has selected or otherwise expressed interest in an open-word action-adventure game such as "Days Gone" or "Grand Theft Auto V." Based on user data and other information in the user profile, the gaming server 110 has determined that the user is most interested in the vehicles and driving or flying aspects of the game. As such, the gaming server 110 identifies an existing interactive gaming application XXX or generates a new interactive gaming application where the gaming sequences where the user is controlling a vehicle. In this example, the gaming server 110 determines through existing data or in response to user reactions during the user's play of the interactive gaming applications that flying an aircraft is of particular interest to the user. As shown in FIG. 4A, the gaming application provides a gaming sequence 400 that allows the user to drive a vehicle. The user is further guided to drive towards an airport, indicated as 402. In a subsequent gaming sequence 404, as shown in FIG. 4B, the user is permitted to enter the cockpit of an aircraft and instructed to takeoff, indicated as 406.

According to one aspect, the gaming server has identified flying an aircraft to be particularly enticing to the user. As such, the server generates a purchase prompt interface 408 right before the user is able to fly the aircraft. In another aspect, the gaming server 110 analyzes the user reaction data received from the client device 170 and determines that the user is displaying behavior indicating that the user is engaged and excitedly anticipating the opportunity to fly the aircraft. Although not pre-programmed to display at this point of the gaming sequence 404, the purchase prompt interface 408 may be displayed in real-time to induce a purchase of the game while the user's interest is at its apex. The user may then purchase a full-version of the game through the gaming server 110.

FIG. 5 is a flowchart illustrating an exemplary method 500 for identifying or generating a customized interactive gaming application that appeals to a particular user. The method 500 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to perform or aid in performing the method. The steps identified in FIG. 5 (and the order thereof) are exemplary and may include various alternatives, equivalents, or derivations thereof including but not limited to the order of execution of the same.

In method 500, information may be stored in memory regarding a game of interest to the user at the client device 170. At step 510, the gaming server 110 receives data identifying a game of interest to a user. In one aspect, the gaming server 110 may generate, for display at the client device 170, a listing, or menu of games available for purchase at the gaming server 110. The listing or menu of games may be a predetermined list of games offered for sale or the list may be customized based upon data in the user profile associated with the user of the client device 170. The user profile data may include user preferences regarding game genre, game themes, characters, or any other data that may be used to identify a user and their interests. Following, an input at the client device 170 in response to the listing or menu, or alternatively, based upon data in the user profile, the gaming server 110 identifies and stores data regarding the game of interest. In various aspects, the user profile data and user interests may be determined or populated based upon user internet activity or interactions or with a variety of services, including but not limited to surveys other games, activities, search engines, retail sites, among others.

At step 520, the gaming server 110, executing one or more modules 310-345 identifies or otherwise determines a gaming style or user preference from user profile data. In one aspect, the gaming style profile identifies types of gaming sequences or actions of interest to the user. In various examples, the gaming style profile may identify a user's affinity for first-person shooting games, driving sequences, fighting games, puzzle solving, and/or character building (i.e. role-playing games). In another example, user preferences within larger categories, such as fighting games, may be further defined as a preference for melee weapons, projectile weapons, modern weapons, historic weapons, or fictional weapons.

At step 530, an interactive gaming application is identified and/or generated. In one aspect, the interactive gaming application is selected from the game of interest. For example, the interactive gaming application 140 may consist of a level, chapter, or some other sub-portion of the game that is reproduced from the game as provided by the game developers. In another aspect, the gaming application is generated from game data and digital assets from the game of interest. In this aspect, the interactive gaming application may contain game sequences or portions of the full video game arranged or presented in a different manner than that provided by the game developers. As such, the interactive gaming application may be customized and generated for a particular user to provide a unique gaming experience configured to specifically appeal to the user.

In step 540, the interactive gaming application is provided to the user client device 170, where the user may play or interact with the gaming application 140. In various aspects, the user may be able to play portions of the game or elements of the game that appeal to the particular user. While playing the game, the user client device may track the user's reactions to the interactive gaming application. For example, the tracking device 224 may monitor the user's pupils or other physical reactions to the gaming application and transmit the user reaction data to the gaming server 110.

At step 550, the gaming server 110 receives user reaction data captured by the tracking device 224 at the client device 170, and then the gaming server 110 may generate a game purchase interface 408 for display to the user at the client device 170, at step 560. In one aspect, the game purchase interface 408 may be a GUI or a pop-up display. In one aspect, the interactive gaming application 140 is interpreted, paused, or terminated a pre-determined point of a gaming sequence that has been determined to be of particular interest to the user. For example, the purchase interface 408 may be displayed during or slightly before the conclusion of a gaming sequence, such as a fight sequence or a boss fight, determined or predicted to appeal to the user. In another aspect, the timing for the display of the game purchase interface 408 may be determined in real-time or near real-time after the user has begun playing the interactive gaming application. In this aspect, the gaming server 110 may process the user reaction data to determine a period of heightened user interest. This period of heightened user interest may occur before any pre-determined prompts for the game purchase interface 408. Alternatively, the user reaction data may be processed to determine that a delay in the display of the game purchase interface is appropriate should the user display interest below a threshold at the time for a predetermined prompt to display the game purchase interface.

The foregoing detailed description of the technology herein has been presented for purposes of illustration and description. It is not intended to be exhaustive or to limit the technology to the precise form disclosed. Many modifications and variations are possible in light of the above teaching. The described aspects were chosen in order to best explain the principles of the technology and its practical application to thereby enable others skilled in the art to best utilize the technology in various aspects and with various modifications as are suited to the particular use contemplated. It is intended that the scope of the technology be defined by the claim.

What is claimed is:

1. A method for providing customized game teasers, the method comprising:

storing in memory a plurality of different interactive gaming sequences associated with an interactive gaming application;

receiving data sent over a communication network, the data captured by a user device during a gameplay session indicating one or more interest levels during different portions of the gameplay session;

determining a gaming style/interest profile of a user of the user device based on the indicated interest levels during the different portions of the gameplay session;

customizing the interactive gaming application corresponding to the gaming style/interest profile, wherein customizing the interactive gaming application includes compiling a subset of the interactive gaming sequences that correspond to user playing style and interests indicated by the gaming style/interest profile; and streaming the customized interactive gaming application over the communication network to the user device for gameplay in a new gameplay session.

2. The method of claim 1, wherein determining the gaming style/interest profile of the user further comprises identifying the subset of the interactive gaming sequences as predicted to be appealing to the user.

3. The method of claim 1, further comprising,
identifying a user response to the customized interactive gaming application provided to the client device; and
terminating the stream of the customized interactive gaming application during a period of peak interest.

4. The method of claim 3, further comprising determining the period of peak interest before streaming the customized interactive gaming application to the user device.

5. The method of claim 3, further comprising determining the period of peak interest based on a user reaction during the gameplay of the customized interactive gaming application.

6. The method of claim 1, wherein the determination of determining the gaming style/interest profile is further based upon user interactions with at least one of a survey, a video game, or other visual displays.

7. The method of claim 6, wherein the user interactions include a conscious interaction.

8. The method of claim 6, wherein the user interactions include a subconscious interaction.

9. A system for providing customized game teasers, the system comprising:
a database that stores in memory plurality of different interactive gaming sequences associated with an interactive gaming application; and
a gaming server that
receives data over a communication network, the data captured by a user device during a gameplay session indicating one or more interest levels during different portions of the gameplay session;
determines a gaming style/interest profile of a user of the user device based on the indicated interest levels during the different portions of the gameplay session;
customizes the interactive gaming application corresponding to the gaming style/interest profile, wherein customizing the interactive gaming application includes compiling a subset of the interactive gaming sequences that correspond to user playing style and interests indicated by the gaming style/interest profile; and
streams the customized interactive gaming application over the communication network to the user device for gameplay in a new gameplay session.

10. The system of claim 9, wherein the gaming server determines the gaming style/interest profile of the user identifying the subset of the interactive gaming sequences as predicted to be appealing to the user.

11. The system of claim 9, wherein the gaming server further:
identifies a user response to the customized interactive gaming application provided to the client device; and
terminates the stream of the customized interactive gaming application during a period of peak interest.

12. The system of claim 11, wherein the gaming server further determines the period of peak interest before streaming the customized interactive gaming application to the user device.

13. The system of claim 11, wherein the gaming server further determines the period of peak interest based on a user reaction during the gameplay of the customized interactive gaming application.

14. The system of claim 9, wherein the gaming server determines the gaming style/interest profile further based upon user interactions with at least one of a survey, a video game, or other visual displays.

15. The system of claim 14, wherein the user interactions include a conscious interaction.

16. The system of claim 14, wherein the user interactions include a subconscious interaction.

17. A non-transitory computer-readable storage medium having embodied thereon a program, the program being executable by a processor to perform a method for providing customized game teasers, the method comprising:
storing a plurality of different interactive gaming sequences associated with an interactive gaming application;
receiving data over a communication network, the data captured by a user device during a gameplay session indicating one or more interest levels during different portions of the gameplay session;
determining a gaming style/interest profile of a user of the user device based on the indicated interest levels during the different portions of the gameplay session;
customizing the interactive gaming application corresponding to the gaming style/interest profile wherein customizing the interactive gaming application includes compiling a subset of the interactive gaming sequences that correspond to user playing style and interests indicated by the gaming style/interest profile; and
streaming the customized interactive gaming application over the communication network to the user device for gameplay in a new gameplay session.

18. The non-transitory computer-readable storage medium of claim 17, wherein determining the gaming style/interest profile of the user further comprises identifying the subset of the interactive gaming sequences as predicted to be appealing to the user.

19. The non-transitory computer-readable storage medium of claim 17, further comprising:
identifying a user response to the customized interactive gaming application provided to the client device; and
terminating the stream of the customized interactive gaming application during a period of peak interest.

20. The non-transitory computer-readable storage medium of claim 19, further comprising determining the period of peak interest before streaming the customized interactive gaming application to the user device.

21. The non-transitory computer-readable storage medium of claim 19, further comprising determining the period of peak interest based on a user reaction during the gameplay of the customized interactive gaming application.

22. The non-transitory computer-readable storage medium of claim 17, wherein determining the gaming style/interest profile is further based upon user interactions with at least one of a survey, a video game, or other visual displays.

23. The non-transitory computer-readable storage medium of claim 22, wherein the user interactions include a conscious interaction.

24. The non-transitory computer-readable storage medium of claim 22, wherein the user interactions include a subconscious interaction.

* * * * *